United States Patent [19]
Theil et al.

[11] Patent Number: 5,837,091
[45] Date of Patent: Nov. 17, 1998

[54] METHOD FOR THERMAL ADHESION OF ACRYLIC PLASTIC PARTS

[75] Inventors: Alexander Theil, Reinheim; Karl-Heinz Fehring, Stockstadt; Manfred Rimpl, Riedstadt, all of Germany

[73] Assignee: Roehm GmbH Chemische Fabrik, Darmstadt, Germany

[21] Appl. No.: 552,933

[22] Filed: Nov. 3, 1995

[30] Foreign Application Priority Data

Nov. 4, 1994 [DE] Germany .......................... 44 39 419.5

[51] Int. Cl.⁶ .................................................. B32B 31/20
[52] U.S. Cl. ................................. 156/308.2; 156/309.9; 156/324; 156/555
[58] Field of Search .................................. 156/351, 358, 156/359, 361, 555, 583.1, 308.2, 309.9, 324; 428/411.1, 423.1, 423.3

[56] References Cited

U.S. PATENT DOCUMENTS

| | | | |
|---|---|---|---|
| 5,057,167 | 10/1991 | Gersbeck | 156/62.2 |
| 5,061,337 | 10/1991 | Fraser | 156/351 |
| 5,158,641 | 10/1992 | Vermeulen et al. | 156/555 |
| 5,282,920 | 2/1994 | Fujii et al. | 156/553 |
| 5,523,168 | 6/1996 | Siol et al. | 428/520 |

FOREIGN PATENT DOCUMENTS

| | | |
|---|---|---|
| 0 584 593 | 3/1994 | European Pat. Off. |
| 1 473 254 | 3/1967 | France . |
| 20 58 585 | 7/1971 | Germany . |

*Primary Examiner*—James Sells
*Attorney, Agent, or Firm*—Oblon, Spivak, McClelland, Maier & Neustadt, P.C.

[57] ABSTRACT

The invention relates to a method for the production of flat laminates (5) from polymethacrylate plastic, by thermal adhesion of at least two parts (1) of polymethacrylate plastic heated at their surface, with the characterizing features that the parts (1) of polymethacrylate plastic, which have been preheated to surface temperatures of 130° to 200° C. on the adhesion side (1a), and which maintain their original shape during the preheating phase, are pressed together between a pair of rollers (2, 3), of which at least one roller (2), by means of which the pressure force (4) is exerted, is mounted in movable manner, at a feed velocity being between 5 and 200 mm/s and a pressure force acting on the roller (3) between 10 and 500 N. Preferably, during the adhesion of the laminates (5), flat or oblong objects (8) with thicknesses which are allowed to amount to a maximum of 50% of the thickness of the parts (1) of polymethacrylate plastic, are embedded between the parts (1) of polymethacrylate plastic which are to be adhered together.

13 Claims, 2 Drawing Sheets

METHOD FOR THERMAL ADHESION OF ACRYLIC PLASTIC PARTS

BACKGROUND OF THE INVENTION

1. Field of the Invention

The invention relates to a method for thermal adhesion of at least two acrylic plastic parts and laminates produced by this method.

2. Discussion of the Background

Acrylic plastics, such as particularly polymethyl methacrylate, demonstrate thermoplastic to thermoelastic behavior when heated, depending on their mean molecular weight.

Polymethacrylate plastics that can be processed thermoplastically, such as those used in injection molding or extrusion, demonstrate mean weight average molecular weights $M_w$ between $2 \times 10^4$ and $5 \times 10^5$, particularly between $5 \times 10^4$ and $2 \times 10^5$ daltons (with regard to the determination of $M_w$, see, for example, H. F. Mark et al., Encyclopedia of Polymer Science and Technology, 2nd ed., Vol. 10, pages 1 to 19, J. Wiley, 1989). Such thermoplastic polymethyl methacrylate plastics can be bonded under pressure at temperatures above 100° C.

The production of laminates from cast polymethacrylate plastics, which generally have molecular weights $M_w > 5 \times 10^5$, is more difficult. The production of such laminates is predominantly carried out using adhesion methods, which are differentiated into adhesion using solvents, using adhesive varnishes as well as using polymerization adhesives.

A disadvantage of methods using solvents or adhesive varnishes is that both methods particularly work with halogenated hydrocarbons as the solvent, because of the advantageous etching properties with polymethacrylates. Halogenated hydrocarbons cause health risks and environmental risks. Furthermore, when adhesion methods which work with solvents are used, cracks can form in the polymethacrylate plastic parts, particularly when combining injection-molded or extruded parts, which generally demonstrate inherent stress. The polymerization adhesives for adhesion of polymethacrylate plastic parts generally contain the components methyl methacrylate, polymethyl methacrylate and, for acceleration of the adhesion process, polymerization initiators such as peroxides, photoinitiators or redox initiators. When using this method, stress crack corrosion can also occur in the polymethacrylate plastic parts, due to the monomer methyl methacrylate which acts as a solvent. The curing times for polymerization adhesives are generally between 1 and 3 hours, which is also disadvantageous for some applications, for example for series production.

Furthermore, laminates of polymethacrylate plastics can be produced by thermal bonding, where both thermoplastic and, with some restrictions, cast, thermoelastic polymethacrylate plastics can be used. Thermal bonding takes place at temperatures above 100° C. and, if necessary, with the application of pressure (see in this regard, for example, Kunststoff-Handbuch [Plastics Handbook], Vol. IX, Polymethacrylate [Polymethacrylates], pages 466, 467, 600, 601, 604 to 608, 613, 614, Carl Hanser, Munich, 1975). In the methods for thermal bonding which are described, local overheating at the bonding points, resulting in decomposition of the polymethacrylate plastics and thereby in the separation of monomer, gaseous methacrylates, must be carefully avoided. In the production of flat laminates, state of the art methods for thermal bonding often result in the formation of monomer gas bubbles and their inclusion in the laminate. For this reason, flat laminates of polymethacrylate plastic were predominantly produced by gluing until now.

In EP-A 584 593, plastic laminates are described in which at least part of the laminate consists of polymethacrylate plastic and at least one bond between two polymethacrylate plastic layers has been produced by thermal bonding, where the thermal bonding is carried out in the presence of an intermediate layer of a polymer composed essentially of methyl methacrylate, with a thickness of between 0.01 and several mm. Preferably, the intermediate layer is a film or a thin sheet of polymethyl methacrylate. Thermal bonding of the plastic laminates claimed in EP-A 584 593 is carried out by heating the materials to 150° to 200° C., preferably to about 170° C., with the heated parts being pressed together under pressure. Using this method, inclusions of air or monomer decomposition products also occur on occasion, if the prescribed temperature sequence is not precisely maintained.

It was therefore the task to satisfy the long felt need for a method for flat adhesion of polymethacrylate plastics, in which method the bonding seam is as invisible as possible and the adhesion can be accomplished without aids, such as adhesives or films, and in which the adhesion surfaces can be achieved without optical non-homogeneities, such as streaks or gas bubbles.

SUMMARY OF THE INVENTION

Surprisingly, it was found that optically perfect flat adhesion of polymethacrylate plastics can be achieved with the following method, without using any additional aids: The polymethacrylate plastics (FIG. 1, 1) are preheated to temperatures between 130° and 200° C. at their surface (la) intended for adhesion or joining, with the prerequisite that the plastic parts themselves remain dimensionally stable, and pressed together between a pair of rollers (2, 3), of which at least one roller (3), by means of which a pressure force (4) can be exerted, is mounted in movable manner, with continuous feed, at a pressure force (4) between 10 and 500 N, with the feed velocity being between 5 and 200 mm/s.

Preferably, the polymethacrylate plastic parts are sheets or films with thicknesses between 0.5 and 100 mm, especially preferably with thicknesses between 1 and 50 mm.

In further preferred embodiments of the invention, flat objects (FIG. 3, 8), such as pictures or color films, or oblong objects (8), such as filaments, wires, steel spirals or thin strips of other plastics, are embedded between the adhesion surfaces (la) of the polymethacrylate plastic parts when they are pressed together. A requirement for this is that the thickness of such objects is a maximum of 50%, preferably a maximum of 25% of the thickness of the polymethacrylate plastic parts.

In a preferred development of the invention, the polymethacrylate plastic parts (1) to be adhered together are sheets which have engravings or embossings (FIG. 2, 6) with a depth of at least 0.2 mm, preferably at least 1 mm, and which are pressed together in such a way that the embossings (6) point towards the adhesion surfaces (la). This makes it possible to produce molded elements with three-dimensional inclusions of a defined form. The surface temperatures on the adhesion sides (la) of the polymethacrylate plastic parts (1) which are necessary for adhesion can be produced using indirect physical methods, such as by means of high-frequency or ultrasound fields, for example, or preferably by direct radiation, for example with hot-air blowers or infrared radiators. In general, the polymethacrylate plastic parts (1) are preheated in the oven to avoid thermal stress, before being subject to heat radiation. The difference between the surface temperature and the core temperature of the polymethacrylate plastic parts (1) is between 20° and 150° C., more preferably between 30° and 120° C., with the core temperature always remaining at least 10° C. below the Vicat softening temperature (VST) of the polymethacrylate plastic.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

The polymethacrylate plastic parts preferably comprised of polymerizates of methyl methacrylate, which can be comprised of up to 50 wt.- % of other monomers which can be copolymerized with methyl methacrylate. It is especially preferred that the proportion of methyl methacrylate be 80 to 100 wt.- %. Possible comonomers are primarily $C_{1-6}$ alkyl acrylates in the alkyl ester remainder, $C_{1-6}$ alkyl and/or methacryl nitrile, styrene and/or substituted styrenes or maleic acid anhydride.

Suitable polymethacrylate plastic parts can be prepared by conventional methods know to those of ordinary skill in the art.

Generally, polymethacrylate plastics with the above composition which can be thermoplastically or thermoelastically formed by conventional methods known to those of ordinary skill in the art, with specific viscosities according to DIN 51562 in chloroform at 25° C. in the range between 20 and 1,000 ml/g, approximately corresponding to mean weight average molecular weights Mw between $3 \times 10^4$ and approximately $5 \times 10^6$ daltons, are used. The Mw of the polymethacrylate is more preferably from $>5 \times 10^5$ to $5 \times 10^6$.

The polymethacrylate plastics can contain usual plastic additives, such as photoprotectors, stabilizers to prevent thermal decomposition, lubricants, fillers as well as dyes or pigments, in particular, in proportions of $10^{-3}$ to 20 wt.- %, with reference to the weight of polymethacrylate.

The polymethacrylate plastics are preferably sheets or films, which allow adhesion over a large area, for which the method according to the invention is preferably suited. The sheets or films preferably demonstrate thicknesses between 0.5 and 100 mm, especially preferably between 1 and 50 mm. There is no particular limit to the area of the polymethylmethacrylate sheets. The area of the sheets can generally range, for example, between 0.01 and 5 square meters, with sheet widths between 0.1 and 2 m and sheet lengths between 0.1 and 5 m. Using films, laminates of practically any desired length can be produced, with widths, for example, of 0.1 to 2 m.

Figure 1:
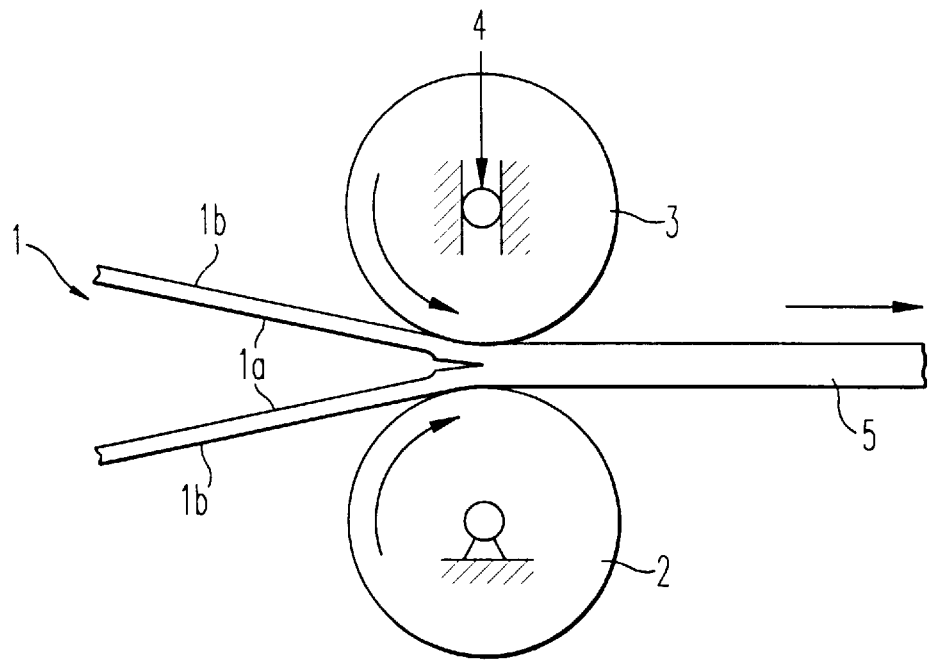
FIG. 1 depicts an apparatus for practicing the method of the present invention.

FIG. 1 shows an apparatus according to the invention for the production of laminates of polymethacrylate parts (1) in a schematic diagram, as an example. The polymethacrylate sheets or films (1), heated to temperatures between 130° and 200° C. at the surface of the adhesion side (1a), are passed through a pair of rollers that rotate in opposite directions, where the bottom roller (2) is fixed in place on bearings and the upper roller (3), which is mounted in movable manner, can have a pressure force (4) of 10 to 500 N applied to it. The feed velocity at which the polymethacrylate sheets or films are pressed together is determined, for example, by way of the speed of rotation of the rollers (2) and (3), and the feed velocity preferably ranges between 5 and 200 mm/s, more preferably between 10 and 150 mm/s, most preferably between 20 and 120 mm/s. The rollers (2) and (3), which preferably consist of stainless steel, for example, are generally polished on their surface or are provided with an elastic surface coating, for example a soft rubber layer with a low Shore hardness (see in this regard see EP-A 201 044), in order not to cause any damage to the surface side (1b) of the sheets or films and later of the laminates (5). In special cases, the surfaces of the rollers (2) and (3) can be textured, making it possible to produce defined patterns on the surface of the laminates (5), and for this purpose, the surfaces (1b) of the sheets or films (1) are preferably heated to temperatures between 100° and 150° C.

The surfaces of the adhesion sides (1a) of the sheets or films (1) are heated in such a way that the sheets or films themselves remain dimensionally stable, where indirect physical methods, such as electromagnetic high-frequency fields or ultrasound fields, for example, can be used. Preferably, direct methods of heat radiation are used, such as hot-air blowers or infrared radiators, for example.

In general, the polymethacrylate plastic parts (1) are preheated in an oven to avoid thermal stress, before being subjected to heat radiation, in such a way that the difference between the surface temperature and the core temperature of the polymethacrylate plastic parts (1) is between 20° and 150° K., preferably between 30° and 120° K., with the core temperature of the polymethacrylate plastic parts (1) always remaining at least 10° K. below the Vicat softening temperature (VST) of the polymethacrylate plastic.

The pressure force (4) which is exerted on the polymethacrylate parts (1) and the laminate (5) of the polymethacrylate parts (1) which is being formed, by means of the upper roller 3, can be produced, for example, with simple lever apparatuses, pneumatically or hydraulically. In general, the pressure force (4) is constant during the entire pressing process, with pressure forces (4) preferably between 10 and 500 N, more preferably between 25 and 400 N, most preferably between 50 and 300 N, being applied.

In another embodiment of the invention, laminates (5) of polymethacrylate plastic parts with flat edges, such as domes, tunnel vaults or shells, can be produced, in that the edges are selectively heated and joined together according to the method of the invention.

The adhesion sides of the polymethacrylate are preferably laminated, in the absence of an external adhesive. The two adhesion sides are preferably brought together, while each adhesion surface is between 130° to 200° C., at a feed rate of between 5 to 200 mm/s and a pressure force between 10 and 500 N. After the polymethacrylate plastic parts are adhered together under pressure, the laminate is allowed to cool to a temperature below 130° C. Cooling can occur passively, or accelerated by means of external cooling, such as by forced air, or a pair of chilled rollers.

Figure 2:
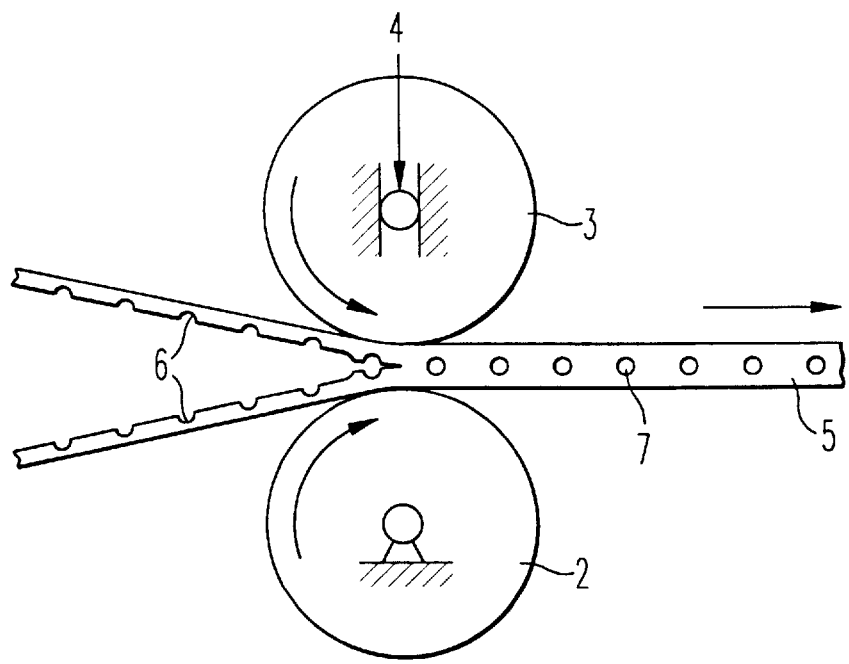
FIG. 2, depicts the method of the present invention in which the sheet or films to be adhered posess engravings or embossings on an adhesion side, resulting in three-dimensional inclusions in the laminate.

The sheets or films (1) can possess engravings or embossings (FIG. 2, 6) which demonstrate a depth of at least 0.2 mm, preferably at least 1 mm, located either on the outside (1b) or the adhesion side (1b) of the sheets or films (2). If the engravings or embossings are located on the adhesion side (1a), three-dimensional inclusions (7) with a defined shape can be produced in the laminate (5) (FIG. 2). Preferably, such three-dimensional inclusions (7) are produced by adhesion of at least two sheets (1), with each sheet demonstrating engravings or embossings (6) on the adhesion side (1a), which are joined together in a mirror image. A prerequisite for the production of such three-dimensional inclusions (7) is that the engravings or embossings (6) remain stable in shape when the surfaces of the adhesion side (1a) are heated to temperatures of up to 200° C. In a further development of the invention, flat or oblong objects (FIG. 3, 8) can be embedded between the adhesion surfaces (1a) of the sheets or films. A prerequisite for optically perfect embedding of such objects, i.e. for example avoidance of air inclusions or smear formation, is that the thickness of the objects (8) is a maximum of 50%, preferably a maximum of 25% of the thickness of the sheets or films. Flat objects (8) which can be embedded between the adhesion sides (1a) of the sheets or films (1) are, for example: photographs, prints, colored films, pigment papers or films of thermoplastic elastomers, where the possibility of producing safety-glass laminates exists for the latter. In this connection, it should be noted that the embedded objects (8) are allowed to take up a maximum of 90% of the surface of the adhesion sides (1a). Oblong objects (8) which can be embedded between the sheets or films (1) are, for example, narrow strips of plastic, which can be dyed, wires, steel spirals, fabric strips, paper strips or preferably filaments, very particularly preferably plastic filaments with high elasticity and a high modulus, such as polyester or nylon filaments, for example, which result in particularly impact-resistant laminates when embedded.

Advantages of the Invention

The method according to the invention allows large-area adhesion of polymethacrylate plastic parts (1), particularly of sheets or films, without the simultaneous production of gas inclusions, which can form due to enclosed air or monomers as thermal decomposition products, using very simple means. When looking at laminates (5) produced in such a way from the top, neither a bonding seam nor other optical non-homogeneities can be visually detected.

Figure 3:
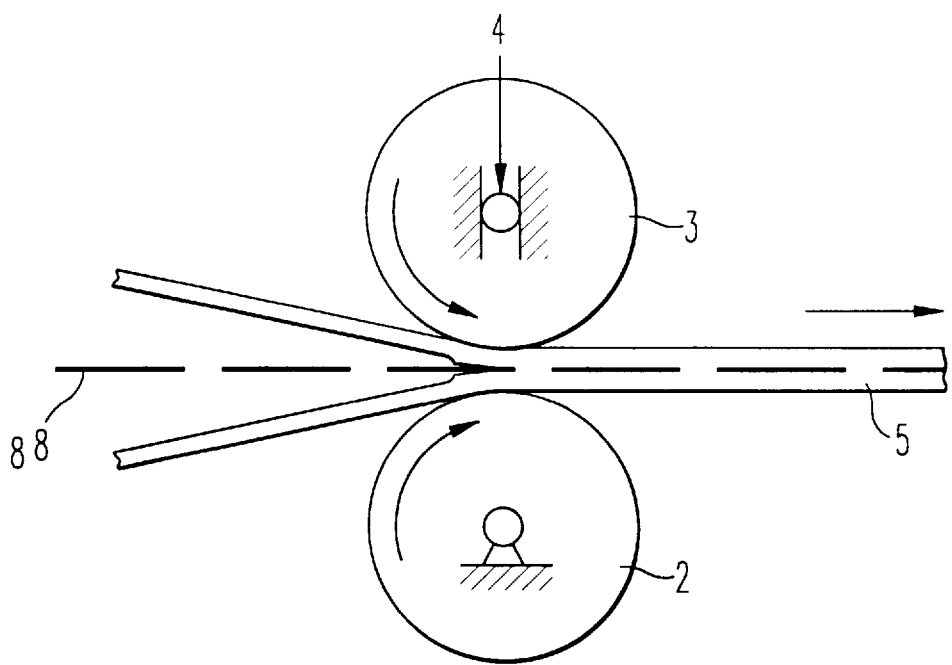
FIG. 3, depicts the method of the present invention, in which a flat or oblong object is embedded into the laminate between the adhesion sides of polymethacrylate plastic.

By adhesion of sheets or films (1) with engravings or embossings (6) on the adhesion side (la), it is possible to produce three-dimensional inclusions (7) with a defined shape in the laminates (5) (FIG. 2), resulting in a very plastic effect of such laminate systems. For example, figures can be produced as inclusions (7), in that the mirror-image half-formats are embossed into the polymethacrylate plastic parts (1) and joined together in a positive lock, using the method according to the invention. Furthermore, flat or oblong objects (8), such as pictures, films, filaments, wires or steel spirals, for example, can be embedded into the laminates (5) between the adhesion sides (1a), in such a way that the polymethacrylate plastic completely surrounds the objects (8) (FIG. 3). Such laminate systems can be advantageously used, for example, in the advertising sector (lighted displays, large advertisements), as laminate systems (with films of thermoplastic elastomers), or as splinter-resistant noise protection walls (with embedded filaments or spirals of steel or of elastic plastics with a high modulus).

Having generally described this invention, a further understanding can be obtained by reference to certain specific examples which are provided herein for purposes of illustration only and are not intended to be limiting unless otherwise specified.

EXAMPLES

Example 1

Production of a Laminate of Polymethyl Methacrylate Sheets with Embedded Paper Picture Two sheets of polymethyl methacrylate (Plexiglas® XT 20070: molecular weight $M_w$ approximately 155,000 daltons) with the dimensions 530×360 ×8 mm (length x width x height) are each heated to a temperature of 175° C. at one surface (adhesion side), arranged in front of the rollers with the adhesion sides opposite each other but still separate, and drawn in between the rollers, together with the paper picture between the adhesion sides, at a feed velocity of 50 mm/s, with the rollers being pressed together with a force of 100 N.

This results in a laminate with an embedded, undamaged paper picture without gas inclusions, in which no bonding seams are visible when viewed from the top.

Example 2

Production of a Laminate of Polymethyl Methacrylate Sheets with Three-dimensional Inclusions Several shapes are embossed, according to usual methods of the state of the art, onto two sheets of polymethyl methacrylate (Plexiglas® XT 20070: molecular weight $M_w$ approximately 155,000 daltons) with the dimensions 275× 165×8 mm (length x width x height) on one surface of each (adhesion side), where the embossing depth is between 0.2 and 10 mm, and the embossed shapes can be joined together with a positive lock when the adhesion sides are placed on top of each other. Then the sheets are each heated to a surface temperature of 175° C. on their adhesion side, arranged in front of the rollers with the adhesion sides opposite each other but still separate, and drawn in between the rollers at a feed velocity of 50 mm/s, with the rollers being pressed together with a force of 100 N. This results in a laminate with embedded three-dimensional inclusions without gas inclusions, in which no bonding seams are visible when viewed from the top.

Obviously, numerous modifications and variations of the present invention are possible in light of the above teachings. It is therefore to be understood that within the scope of the appended claims, the invention may be practiced otherwise than as specifically described herein.

This application is based on German Patent Application P 41 39 419.5, filed with the German Patent Office on Nov. 4, 1994, the entire contents of which are hereby incorporated by reference.

What is claimed as new and desired to be secured by Letters Patent of the United States is:

1. A method for the production of flat laminates from polymethacrylate plastic, by thermal adhesion of at least two parts of polymethacrylate plastic heated at their surface, comprising (i) heating an adhesion side of at least two parts of polymethacrylate plastic, to a surface temperature of 130° to 200° C., while maintaining the original shape of said polymethacrylate plastic during the heating phase, (ii) pressing directly together said adhesion sides of said at least two parts of polymethacrylate plastic between a pair of rollers, by means of which a pressure force can be exerted, while applying a pressure force of between 10–500 N, at a feed velocity being between 5 and 200 mm/s wherein at least one roller of said pair of rollers is mounted in a movable manner.

2. The method of claim 1, wherein said at least two parts of polymethacrylate plastic are sheets or films with thicknesses between 0.5 and 100 mm.

3. The method of claim 1, wherein said at least two parts of polymethacrylate plastic are sheets or films with thicknesses between 1 and 50 mm.

4. The method of claim 1, wherein a flat or oblong object with a thickness which amount to a maximum of 50%, of a thickness of said parts of polymethacrylate plastic, is used between said parts of polymethacrylate plastic which are to be adhered together, wherein said flat or oblong object is allowed to cover a maximum of 90% of an adhesion surface.

5. The method of claim 1, wherein at least one of said at least two parts of polymethacrylate plastic demonstrate engravings or embossings with a depth of at least 0.2 mm, at an adhesion surface, where said at least two parts of polymethacrylate plastic are pressed together in such a way that laminates with three-dimensional inclusions with a defined shape are formed.

6. The method of claim 1, wherein a difference between a surface temperature of an adhesion side and a core temperature of said at least two parts of polymethacrylate plastic is at least 20° C.

7. The method of claim 1, wherein a difference between a surface temperature of an adhesion side and a core temperature of said at least two parts of polymethacrylate plastic is at least 50° C.

8. The method of claim 1, wherein said polymethacrylate plastic possesses at least 50 wt. % methyl methacrylate units.

9. The method of claim 1, wherein said polymethacrylate plastic possesses at least 80 wt. % methyl methacrylate units.

10. The method of claim 2, wherein said sheets or films have widths between 0.1 and 2 m as well as lengths between 0.1 and 5 m.

11. The method of claim 4, wherein said flat object is a film of thermoplastic elastomer.

12. The method of claim 4, wherein said flat or oblong object is selected from the group consisting of a wire, a steel spiral or a filament.

13. The method of claim 4, wherein said flat or oblong object is a plastic filament with high elasticity and a high modulus.

* * * * *